(12) United States Patent
Wu

(10) Patent No.: US 10,371,220 B2
(45) Date of Patent: Aug. 6, 2019

(54) APPARATUS FOR RETURNING PISTONS OF A DISC BRAKE

(71) Applicant: Pi-Liang Wu, Taichung (TW)

(72) Inventor: Pi-Liang Wu, Taichung (TW)

( * ) Notice: Subject to any disclaimer, the term of this patent is extended or adjusted under 35 U.S.C. 154(b) by 269 days.

(21) Appl. No.: 15/414,644

(22) Filed: Jan. 25, 2017

(65) Prior Publication Data

US 2018/0180117 A1 Jun. 28, 2018

(30) Foreign Application Priority Data

Dec. 27, 2016 (TW) .............................. 105143491 A

(51) Int. Cl.
*B25B 13/46* (2006.01)
*F16D 41/066* (2006.01)
*F16D 65/00* (2006.01)

(52) U.S. Cl.
CPC ........ *F16D 65/0043* (2013.01); *B25B 13/463* (2013.01); *F16D 41/066* (2013.01); *F16D 2041/0665* (2013.01)

(58) Field of Classification Search
CPC ... B25B 13/463; B25B 13/461; B25B 13/465; B25B 13/46; B25B 13/468; F16D 41/066; F16D 2041/0665; F16D 15/00; F16D 41/064066; F16D 2300/12
USPC .............. 188/82.84; 192/41 R; 81/58.4, 59.1
See application file for complete search history.

(56) References Cited

U.S. PATENT DOCUMENTS

| | | | |
|---|---|---|---|
| 5,269,053 A | 12/1993 | Hicks | |
| 5,779,015 A * | 7/1998 | Murata | ................. F16D 41/066 |
| | | | 192/42 |
| 6,574,846 B1 | 6/2003 | Kang | |
| 7,076,850 B2 | 7/2006 | Ploeger et al. | |
| 8,393,063 B2 | 3/2013 | Hodges et al. | |
| 8,826,504 B1 * | 9/2014 | Slivon | ................. B25B 27/0035 |
| | | | 29/239 |
| 2006/0027050 A1 * | 2/2006 | Hsien | ..................... B25B 13/463 |
| | | | 81/63.2 |
| 2006/0102442 A1 * | 5/2006 | Dein | ..................... B25B 13/461 |
| | | | 192/44 |
| 2010/0236044 A1 | 9/2010 | Bearman | |

(Continued)

FOREIGN PATENT DOCUMENTS

TW I374796 B1 10/2012
TW 201822962 A * 12/2016

*Primary Examiner* — Christopher M Koehler
*Assistant Examiner* — Mahdi H Nejad

(57) ABSTRACT

A piston-returning apparatus for a disc brake includes two pushing plates, a collar, a rotating unit and a handle. Each of the pushing plates includes a threaded element. The collar includes two screw holes for receiving the threaded elements of the pushing plates respectively so that the pushing plates are synchronously moved toward or away from the collar when the collar is rotated. The handle is connected to the collar via the rotating unit. The rotating unit is switchable between two modes. In the first mode, the rotating unit rotates the collar clockwise when the handle is pivoted clockwise but the rotating unit does not rotate the collar counterclockwise when the handle is pivoted counterclockwise. In the second mode, the rotating unit rotates the collar counterclockwise when the handle is pivoted counterclockwise but the rotating unit does not rotate the collar clockwise when the handle is pivoted clockwise.

5 Claims, 9 Drawing Sheets

(56) References Cited

U.S. PATENT DOCUMENTS

| | | | | |
|---|---|---|---|---|
| 2010/0269639 A1* | 10/2010 | Sroka | ............... | B25B 13/463 |
| | | | | 81/58.2 |
| 2013/0022467 A1* | 1/2013 | Watkins | ............ | F16D 41/105 |
| | | | | 416/169 R |
| 2013/0255060 A1* | 10/2013 | Johnson | ............ | B25B 13/46 |
| | | | | 29/456 |
| 2015/0136557 A1* | 5/2015 | Bastel | ............ | F16D 41/06 |
| | | | | 192/42 |
| 2015/0285318 A1* | 10/2015 | Lin | ............ | F16D 27/01 |
| | | | | 192/45.001 |

\* cited by examiner

APPARATUS FOR RETURNING PISTONS OF A DISC BRAKE

BACKGROUND OF INVENTION

1. Field of the Invention

The present invention relates to a tool for repairing a vehicle and, more particularly, to an apparatus for returning pistons of a disc brake into a caliber in replacing used linings with new ones.

2. Related Prior Art

A typical disc brake includes a disc and a caliber. The disc is connected to an axle for a wheel of a vehicle so that the disc is rotatable with the axle. The caliber is connected to a suspension of the vehicle near the disc. The caliber includes two linings and two corresponding pistons. The linings are located on two opposite sides of the disc. Each of the linings is movable to the corresponding side of the disc. Each of the pistons is movably inserted in a corresponding one of two cylinders included in the caliber. Each of the pistons is located, at an end, in the vicinity of the corresponding lining. When a brake pedal is hit, fluid travels into the cylinders of the caliber to push the pistons to press the linings against the sides of the disc. Friction between the linings and the sides of the disc slows and/or finally stops the axle and hence the wheel.

The linings will be worn away due to the friction. That is, the thickness of each of the linings will be reduced. The thickness of each of the linings reaches a lower limit after some time of use. The linings must be replaced with new ones to ensure normal operation of the disc brake for safety.

To replace the linings with new ones, the caliber is detached from the suspension so that the linings are moved away from the sides of the disc. Then, a tool is used to push the pistons back into the caliber to allow the mounting of new linings.

In U.S. Pat. No. 8,826,504 entitled "Disc Brake Piston Retractor Tool", there is disclosed a tool for moving or pressing a disc brake piston into a retracted position relative to a cylinder of the disc brake caliper assembly in order to allow the replacement of worn brake pads in the caliper assembly, which is includes first and second pressure plates having respective externally threaded first and second studs. A coupler is internally threaded to threadably receive the first stud and the second stud from opposite open ends of the coupler. Selective rotation of the coupler results in simultaneous lateral movement of the first and second pressure plates towards and away from the coupler between retracted and extended positions. One of the pressure plates is engageable against the at least one piston to retract the piston, and the other of the pressure plates is supported against an interior surface of the caliper assembly opposite the one piston, or is engageable against at least one other piston in the caliper assembly opposite the one piston to retract the other piston.

The present invention is therefore intended to obviate or at least alleviate the problems encountered in prior art.

SUMMARY OF INVENTION

It is the primary objective of the present invention to provide an apparatus for returning pistons of a disc brake into a caliber in replacing used linings with new ones.

To achieve the foregoing objective, the piston-returning apparatus for a disc brake comprising: a first pushing plate comprising a first threaded element, a second pushing plate extending parallel to the first pushing plate and comprising a second threaded element, a collar located between the first and second pushing plates and comprising an annular flange formed thereon, a first screw hole for receiving the first threaded element, and a second screw hole for receiving the second threaded element so that the first and second pushing plates are synchronously moved toward or away from the collar when the collar is rotated, a rotating unit connected to the collar and comprising: two restraining plates that rotationally support the collar and abut against two opposites sides of the annular flange, a movable plate located between the restraining plates and comprising: a front edge near the annular flange, a rear edge near the handle, two slots each comprising first and second recesses extending toward the rear edge from two ends thereof, first and second rear cutouts made in the rear edge, a front cutout made in the front edge and made with depth that is larger in a middle portion than at two ends, a first roller movable in the front cutout and adapted for abutment against the annular flange; two pins each extending throughout a corresponding one of the slots and comprising two ends connected to the restraining plates, a holding plate located between the restraining plates and comprising two cutouts made in an internal edge and each made with depth that is deeper in a middle portion than at two ends, and two second rollers movably inserted in the cutouts of the holding plate and adapted for abutment against the annular flange, wherein the second rollers is made with a diameter smaller than the depth of the cutouts of the holding element in the middle portion but larger than the depth of the cutouts of the holding element at the ends, and a handle comprising a slit closed on two sides by the restraining plates, a spring inserted in the slit, and a ball inserted in the slit and pushed into a selected one of the first and second rear cutouts by the spring to keep the movable plate in a selected one of two positions relative to the handle.

Preferably, the first screw hole is in communication with the second screw hole, wherein the first threaded element comprises a bore for receiving the second threaded element, wherein the bore is made with a diameter larger than that of the second threaded element.

Preferably, the movable plate comprises an upper end extending beyond upper edges of the restraining plates and a lower end extending beyond lower edges of the restraining plates so that the movable plate can easily be moved by the upper and lower ends.

Preferably, each of the first and second pushing plates comprises a rectangular aperture, wherein each of the first and second threaded elements comprises a rectangular insert inserted in the rectangular aperture of a corresponding one of the first and second pushing plates to connect each of the first and second threaded elements to a corresponding one of the first and second pushing plates.

Preferably, the rectangular insert of each of the first and second pushing plates comprises a screw hole, a spring inserted in the screw hole, an abutting element inserted in the screw hole, and a socket set screw inserted in the screw hole, the spring is compressed between the abutting element and the socket set screw so that the spring abuts the abutting element against a wall of the rectangular aperture of the first and second pushing plates.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
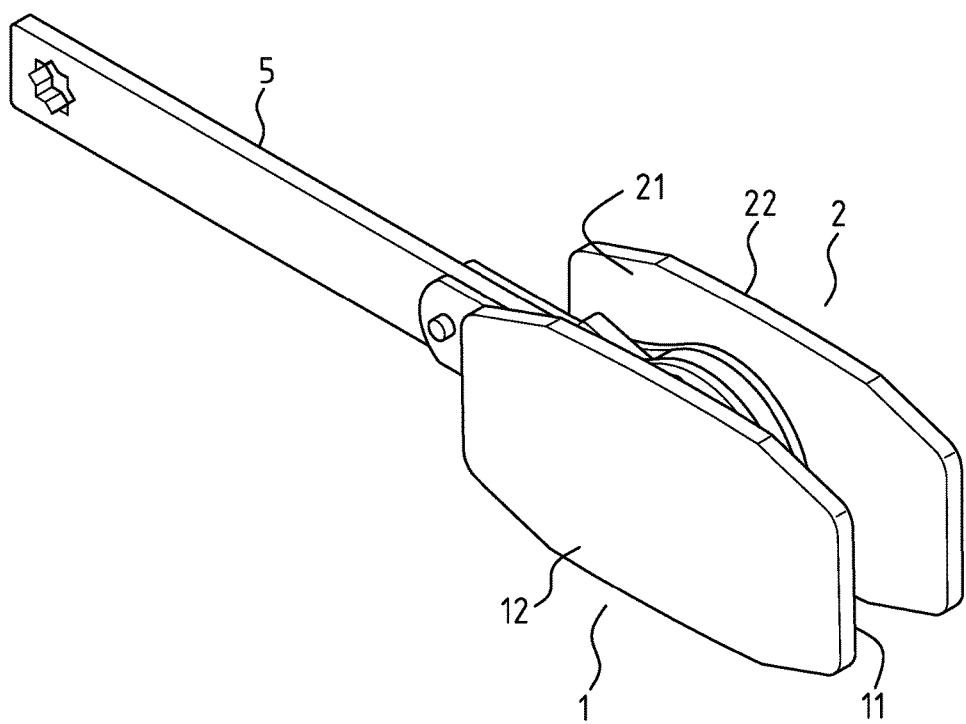
FIG. 1 is a perspective view of an apparatus for returning pistons into a caliper of a disc brake according to the first embodiment of the present invention.
Figure 2:
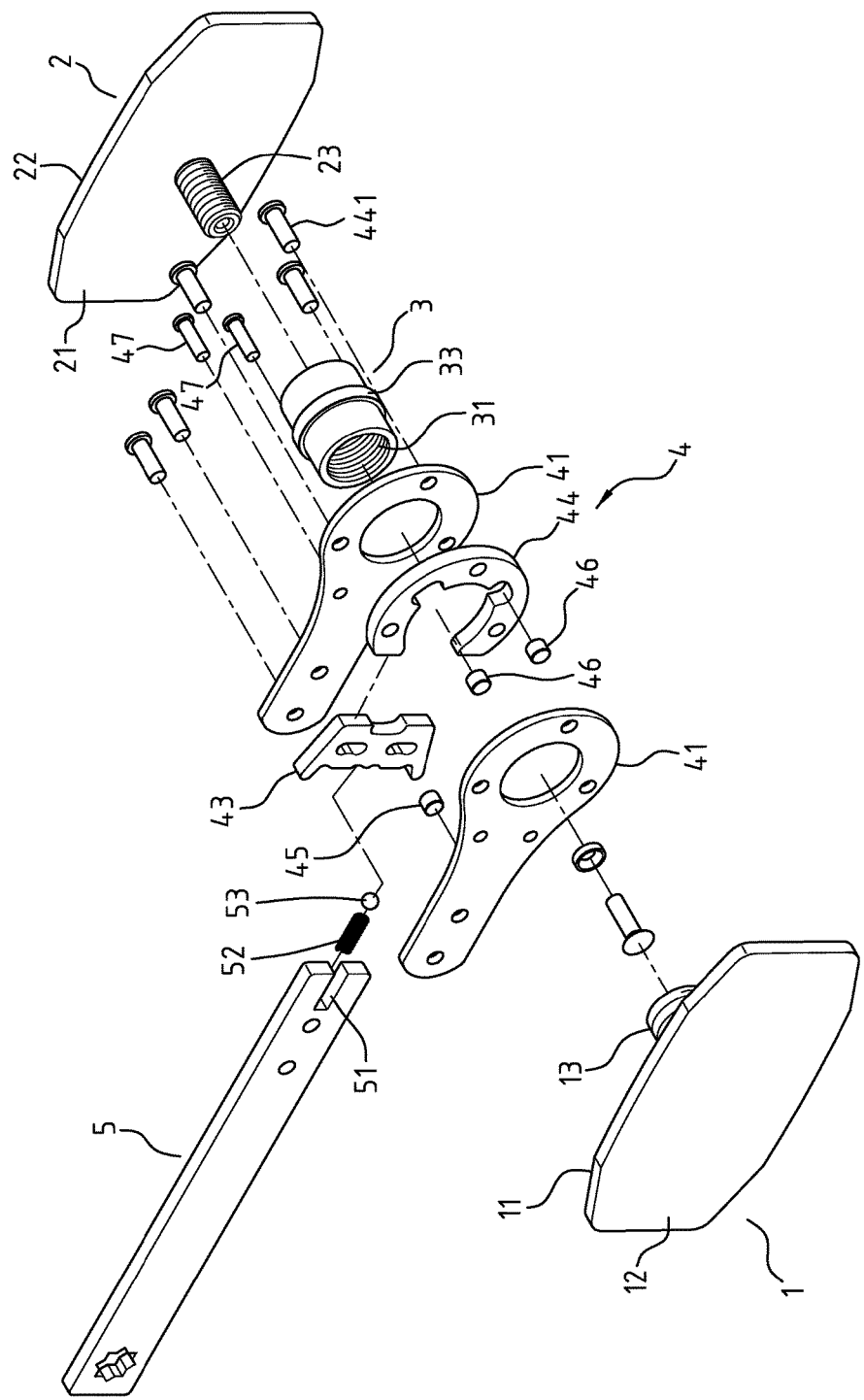
FIG. 2 is an exploded view of the apparatus shown in FIG. 1.
Figure 3:
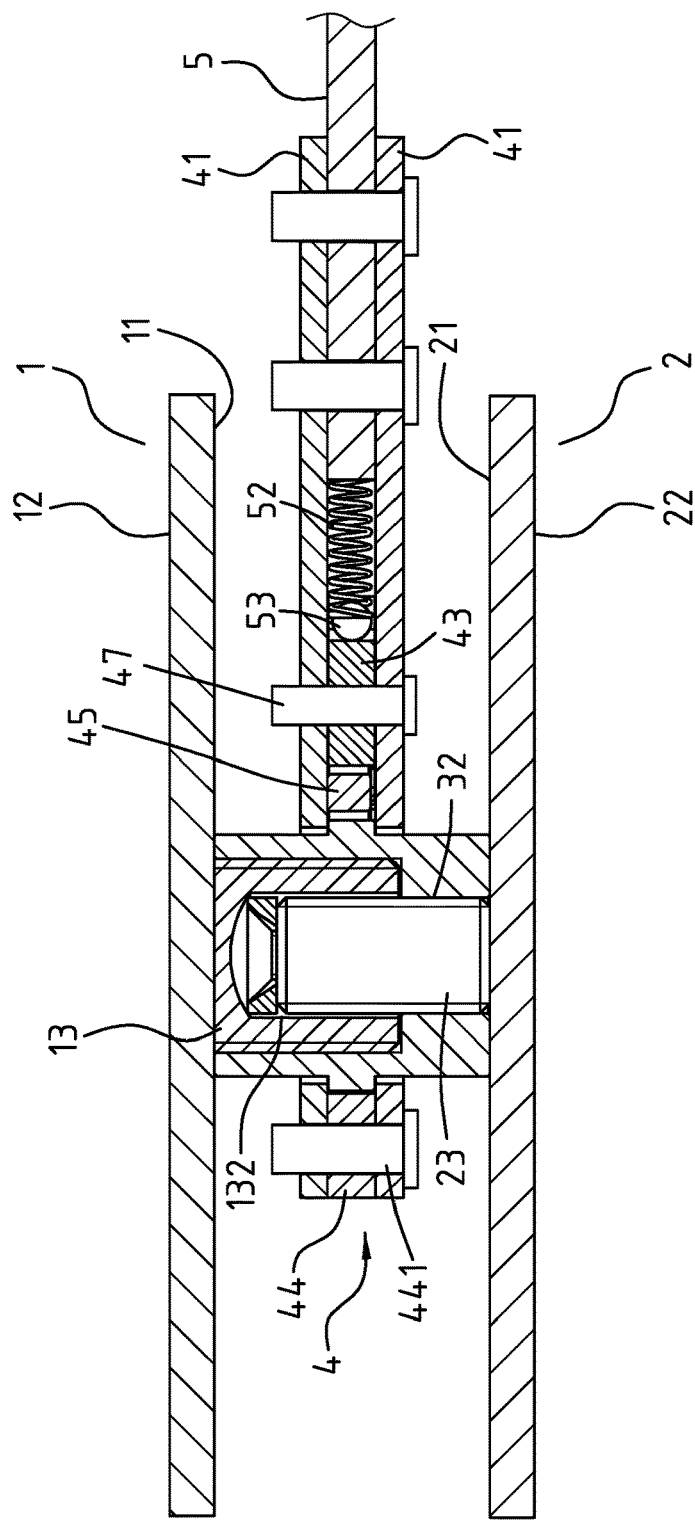
FIG. 3 is a cross-sectional view of the apparatus shown in FIG. 1.

Referring to FIGS. 1 through 3, an apparatus for returning pistons into a caliper of a disc brake includes a first pushing plate 1, a second pushing plate 2, a collar 3, a rotating unit 4 and a handle 5 according to a first embodiment of the present invention. The first pushing plate 1 extends parallel to the second pushing plate 2. The collar 3 is located between the first pushing plate 1 and the second pushing plate 2.

The first pushing plate 1 includes an internal face 11 near the collar 3, an external face 12 opposite to the internal face 11, and a first threaded element 13 extending from the internal face 11. The first threaded element 13 is formed with a right-hand thread. The first threaded element 13 further includes a bore 132 in a free end.

The second pushing plate 2 includes an internal face 21 near the collar 3, an external face 22 opposite to the internal face 21, and a second threaded element 23 extending from the internal face 21. The second threaded element 23 is formed with a left-hand thread. The second threaded element 23 is made with an external diameter smaller than a diameter of the bore 132.

The collar 3 includes a first screw hole 31 in an end and a second screw hole 32 in an opposite end. The first screw hole 31 is in communication with the second screw hole 32. The first screw hole 31 is a right-hand screw hole. The second screw hole 32 is a left-hand screw hole. The collar 3 further includes an annular flange 33 extending on and around a middle portion.

The first threaded element 13 is inserted the first screw hole 31. The second threaded element 23 is inserted in the second screw hole 32. Hence, by rotating the collar 3 clockwise or counterclockwise, the first threaded element 13 and the second threaded element 23 are moved in opposite senses of direction, and so are the first pushing plate 1 and the second pushing plate 2. That is, the first pushing plate 1 and the second pushing plate 2 are moved toward or away from the collar 3 at the same time. The second threaded element 23 is freely inserted in the bore 132 of the first threaded element 13.

Figure 4:
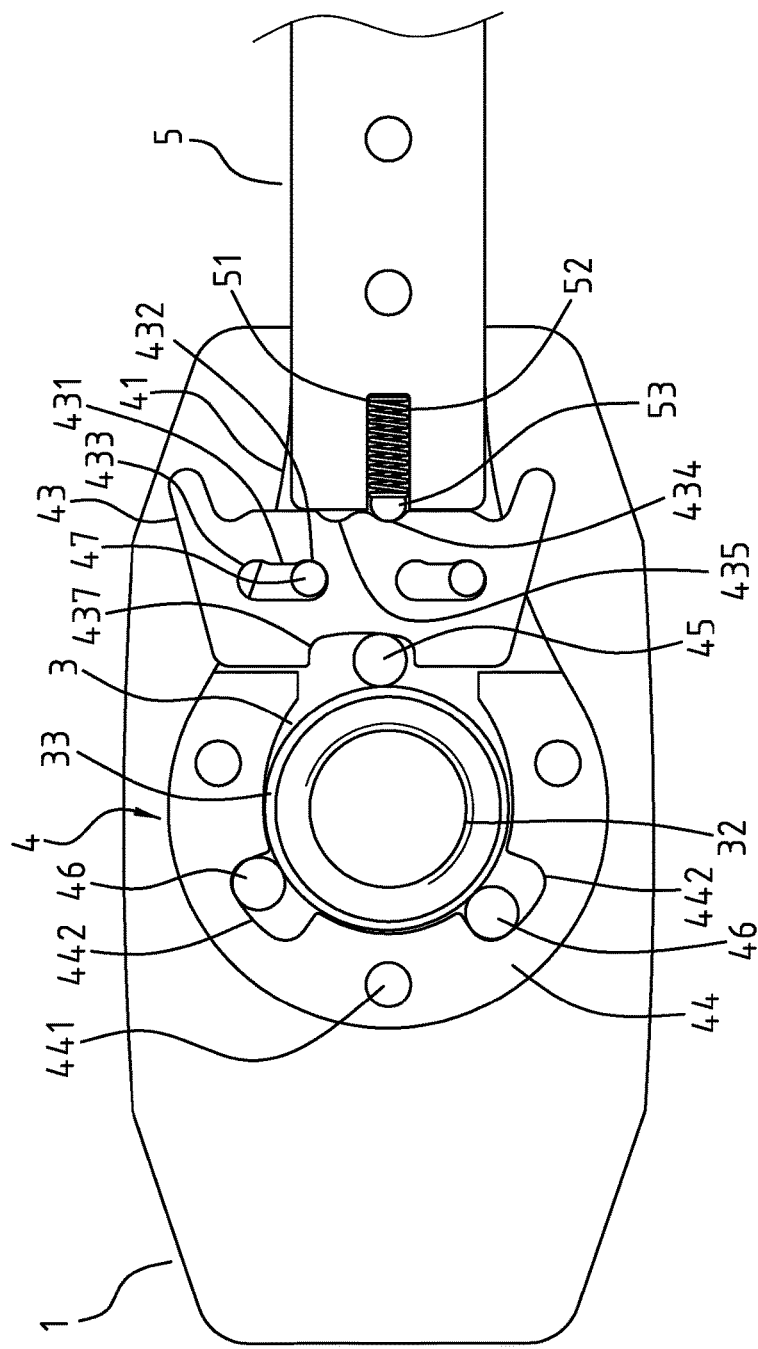
FIG. 4 is a side view of the apparatus shown in FIG. 1 without a pushing plate, a threaded element and a lining.

Referring to FIG. 4, the rotating unit 4 is connected to the collar 3 at an end and connected to the handle 5 at another end. Thus, the handle 5 is operable to rotate the collar 3 in two opposite senses of direction via the rotating unit 4.

The rotating unit 4 includes two restraining plates 41, a movable plate 43, a holding plate 44, a roller 45, two rollers 46 and two pins 47. The restraining plates 41 extend parallel to each other. Each of the restraining plates 41 includes an annular portion located around a corresponding portion of the collar 3.

The holding plate 44 is a C-shaped flat element that includes two cutouts 442 at an internal edge. Each of the cutouts 442 gets deeper into the internal edge of the holding plate 44 in the middle than at two ends.

The movable plate 43 includes a front edge near the annular flange 33, a rear edge near the handle 5, an upper edge and a lower edge. The movable plate 43 includes two slots 431. Each of the slots 431 includes a first recess 432 in a lower end and a second recess 433 in an upper end near. The first and second recesses 432 and 433 extend toward the rear edge of the movable plate 43. The movable plate 43 includes two rear cutouts 434 and 435 at the rear edge and a front cutout 437 at the front edge. The rear cutouts 434 and 435 are located near the handle 5. The front cutout 437 is located near the annular flange 33. A portion of the front edge of the movable plate 43 corresponding to the front cutout 437 extends in an arc to render the front cutout 437 deeper into the front edge of the movable plate 43 in the middle than at upper and lower ends.

The handle 5 is an elongated flat element that is made with a slit 51 in a front end. A spring 52 is inserted in the slit 51 before a ball 53. The ball 53 is biased by the spring 52.

In assembly, the holding plate 44 is located between the restraining plates 41. The holding plate 44 is connected to the restraining plates 41 by rivets 441. The internal edge of the holding plate 44 extends around the annular flange 33. The cutouts 442 are located near the annular flange 33.

Each of the rollers 46 is inserted in a corresponding one of the cutouts 442. The periphery of each of the rollers 46 is in contact with that of the annular flange 33. The length of each of the cutouts 442, measured from an upper end to a lower end, is larger than the diameter of the corresponding roller 46 to allow each of the rollers 46 to move between the upper and lower ends of the corresponding cutout 442. The diameter of each of the rollers 46 is smaller than the depth of the corresponding cutout 442 in the middle but larger than the depth of the corresponding cutout 442 at the ends.

The movable plate 43 is located between the restraining plates 41. The movable plate 43 extends beyond upper and lower edges of the restraining plates 41 to facilitate rotation of the movable plate 43 in two opposite senses of direction. The front edge of the movable plate 43 is located near a rear end of the holding plate 44.

Each of the pins 47 extends throughout a corresponding one of the slots 431. Each of the pins 47 includes two ends fitted in apertures not numbered made in the restraining plates 41. Thus, the movable plate 43 is kept between the restraining plates 41, and the rotation of the movable plate 43 in the opposite senses of direction is limited in a range.

The roller 45 is inserted in the front cutout 437. The periphery of the roller 45 is in contact with that of the annular flange 33. The length of the front cutout 437, measured from an upper end to a lower end, is larger than the diameter of the roller 45 to allow the roller 45 to move in the front cutout 437 between the upper and lower ends as the movable plate 43 is rotated relative to the roller 45.

The front end of the handle 5 is located between the restraining plates 41 so that the slit 51 is closed by the restraining plates 41 on two sides. The front end of the handle 5 is secured to the restraining plates 41 by rivets or pins for example. A front portion of the ball 53 is abutted against the rear edge of the movable plate 43. A rear portion of the ball 53 is in contact with the spring 52 so that the spring 52 presses the ball 53 against the movable plate 43. The ball 53 is moved between the rear cutouts 434 and 435 when the movable plate 43 is moved relative to the handle 5. The ball 53 is selectively inserted in the rear cutout 434 or 435 to keep the movable plate 43 in a selected one of two positions relative to the handle 5.

Figure 5:
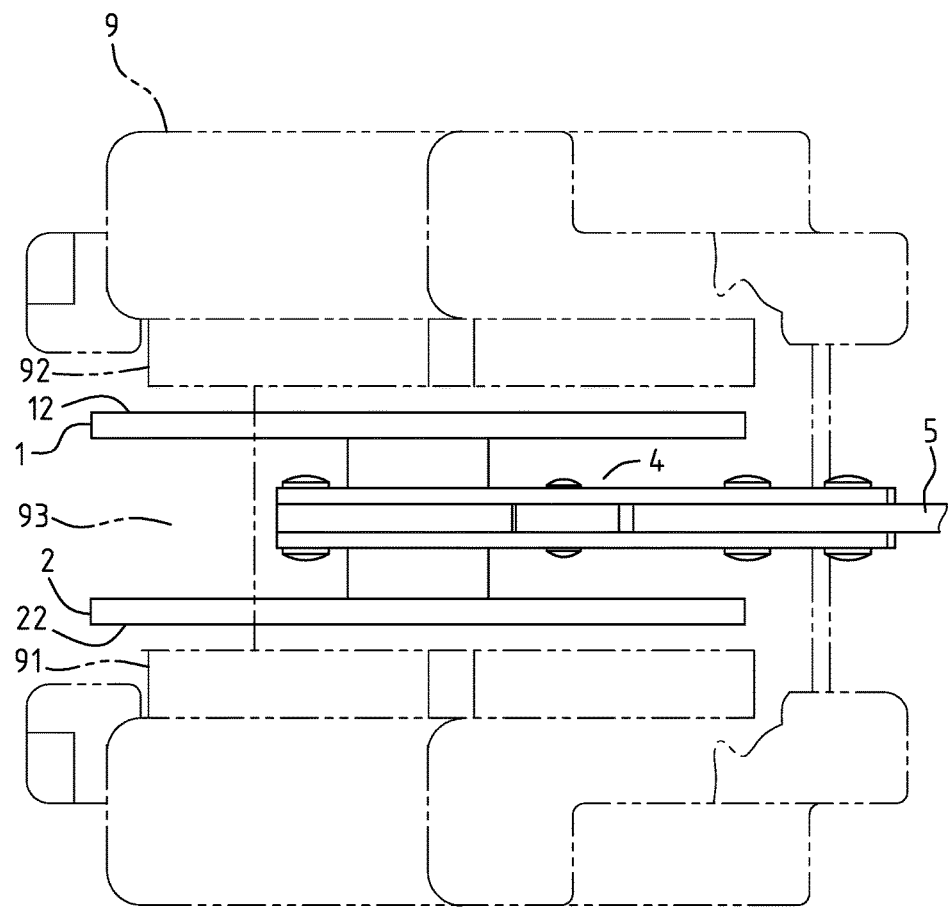
FIG. 5 is a top view of the apparatus shown in FIG. 1.

Referring to FIG. 5, a disc brake includes a disc (not shown), a caliber 9, and two linings (not shown). The caliber 9 includes two pistons 91 and 92 separated from each other by a gap 93.

To replace used linings with new ones, the caliber 9 is detached from a vehicle before the used linings are moved away from the disc. Then, the apparatus is used to return pistons 92 into the caliber 9. The handle 5 is operated to insert the first and second pushing plates 1 and 2 in the gap 93, which is clear of the disc. The external face 12 of the first pushing plate 1 is located near the piston 91. The external face 22 of the second pushing plate 2 is located near the piston 92. Then, the handle 5 is pivoted to and fro to drive the rotating unit 4.

Figure 6:
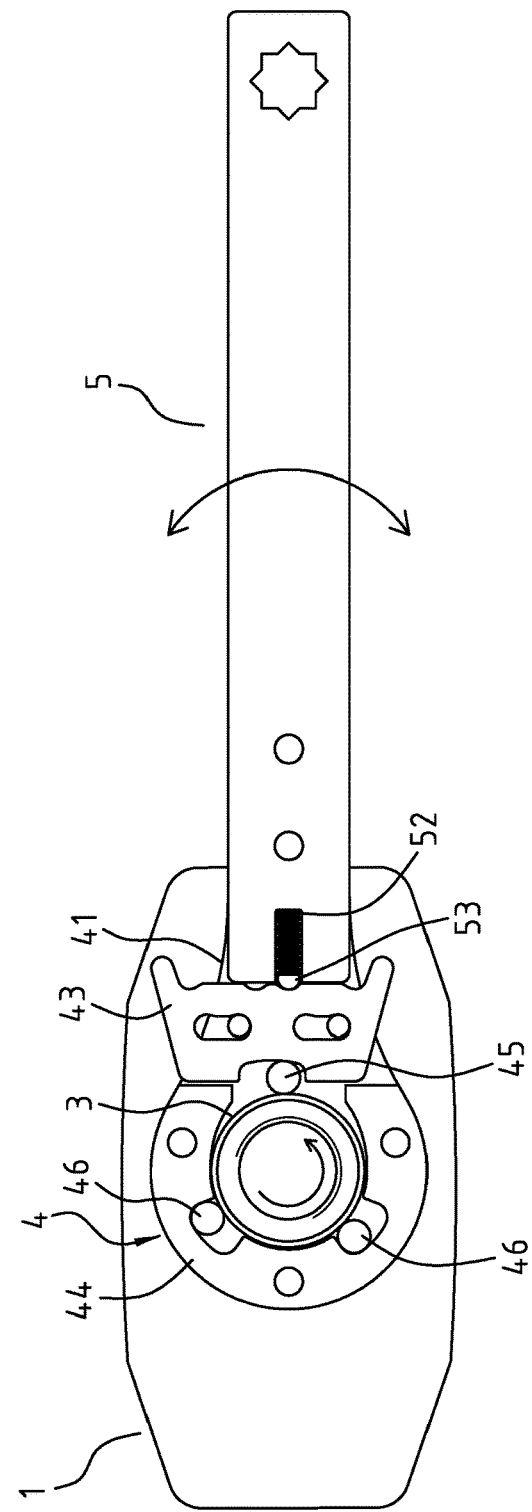
FIG. 6 is an enlarged view of the apparatus shown in FIG. 4.

Referring to FIG. 6, the movable plate 43 is in an upper position where the rear cutout 434 receives the ball 53 and the first recess 432 of each of the slots 431 receives the corresponding pin 47. In use, the handle 5 is pivoted to and fro.

When pivoted counterclockwise, the handle 5 in turn rotates the restraining plates 41, the movable plate 43 and the holding plate 44. The movable plate 43 abuts the roller 45 to against the annular flange 33. The holding plate 44 abuts the rollers 46 against the annular flange 33. The rollers 45 and 46 exert on the annular flange 33 forces that are biased from the axis of the collar 3. Thus, the rollers 45 and 46 grasp and rotate the annular flange 33 and hence the collar 3 counterclockwise. The first and second pushing plates 1 and 2 prevent the first and second threaded elements 13 and 23 from rotation with the collar 3. As mentioned above, the threads of the first and second threaded elements 13 and 23 extend in opposite senses of direction so that the first and second threaded elements 13 and 23 synchronously move the first and second pushing plates 1 and 2 away from the collar 3 when the collar 3 is rotated counterclockwise. Thus, the first and second pushing plates 1 and 2 respectively return the pistons 91 and 92 into the caliber 9.

Then, the handle 5 is pivoted clockwise to rotate the restraining plates 41, the movable plate 43 and the holding plate 44 clockwise. Thus, the movable plate 43 stops pressing the roller 45, and the holding plate 44 stops pressing the rollers 46. Hence, the rollers 45 and 46 stop grasping the annular flange 33. That is, the handle 5 rotates the restraining plates 41, the movable plate 43 and the holding plate 44 clockwise, without rotating the collar 3 or moving the first and second pushing plates 1 and 2.

As discussed above, the ball 53 is inserted in the rear cutout 434, the pins 47 are inserted in the corresponding first recesses 432, the handle 5 is pivoted to and fro to move the first pushing plate 1 and the second pushing plate 2 away from the collar 3 in an intermittent manner to push the pistons 91 and 92 back into the caliber 9.

Figure 7:
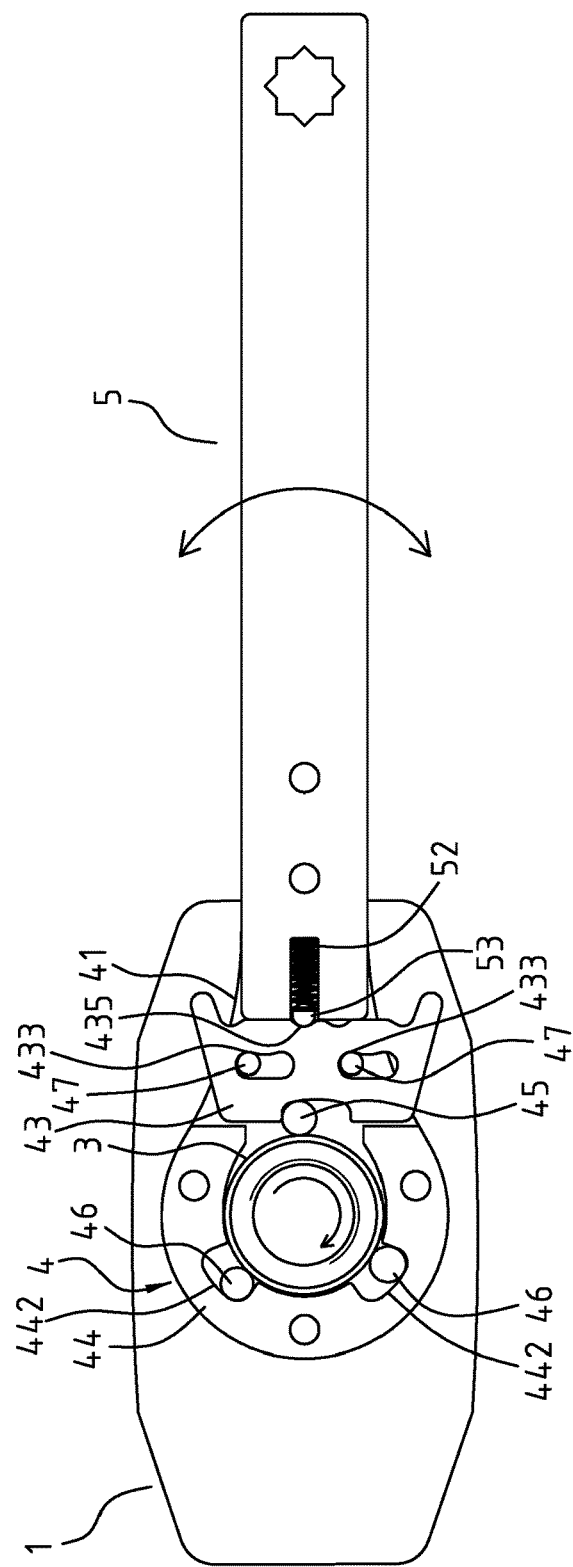
FIG. 7 is a side view of the apparatus in another position than shown in FIG. 6.

Referring to FIG. 7, the movable plate 43 is moved downward to cause the rear cutout 435 to receive the ball 53 after the pistons 91 and 92 are pushed back into the caliber 9. Now, the second recess 433 of each of the slots 431 receives the corresponding pin 47. The handle 5 is pivoted clockwise to drive the restraining plates 41, the movable plate 43 and the holding plate 44 clockwise. The movable plate 43 presses the roller 45 against the annular flange 33. The holding plate 44 presses the rollers 46 against the annular flange 33. The roller 45 and 46 exert on the annular flange 33 forces that are biased from the axis of the collar 3. Thus, the rollers 45 and 46 grasp and rotate the annular flange 33 and hence the collar 3 clockwise. The first and second pushing plates 1 and 2 prevent the first and second threaded elements 13 and 23 from rotation with the collar 3. The threads of the first and second threaded elements 13 and 23 extend in opposite senses of direction. Hence, when the collar 3 is rotated clockwise, the first and second threaded elements 13 and 23 move the first and second pushing plates 1 and 2 toward the collar 3. That is, the first and second pushing plates 1 and 2 are respectively moved away from the pistons 91 and 92.

When the handle 5 is pivoted counterclockwise, the handle 5 rotates the restraining plates 41, the movable plate 43 and the holding plate 44 counterclockwise. Thus, the movable plate 43 stops pressing the roller 45, and the holding plate 44 stops pressing the rollers 46. Accordingly, the rollers 45 and 46 do not exert any force on the annular flange 33. That is, when the handle 5, the restraining plates 41, the movable plate 43 and the holding plate 44 are rotated counterclockwise, the collar 3 is not rotated so that the first and second pushing plates 1 and 2 are not rectilinearly moved.

As discussed above, the rear cutout 435 receives the ball 53, and the second recess 433 of each of the slots 431 receives the corresponding pin 47. The handle 5 is pivoted to and fro to move the first and second pushing plates 1 and 2 toward the collar 3 in an intermittent manner. That is, the first and second pushing plates 1 and 2 are moved away from the pistons 91 and 92. Hence, the first and second pushing plates 1 and 2, the collar 3 and the rotating unit 4 can be moved out of the gap 93.

There are some disc brakes each of that includes a single piston movably inserted in the caliber. The apparatus of the present invention can be used to push the single piston back into the caliber of such a disc brake.

Figure 8:
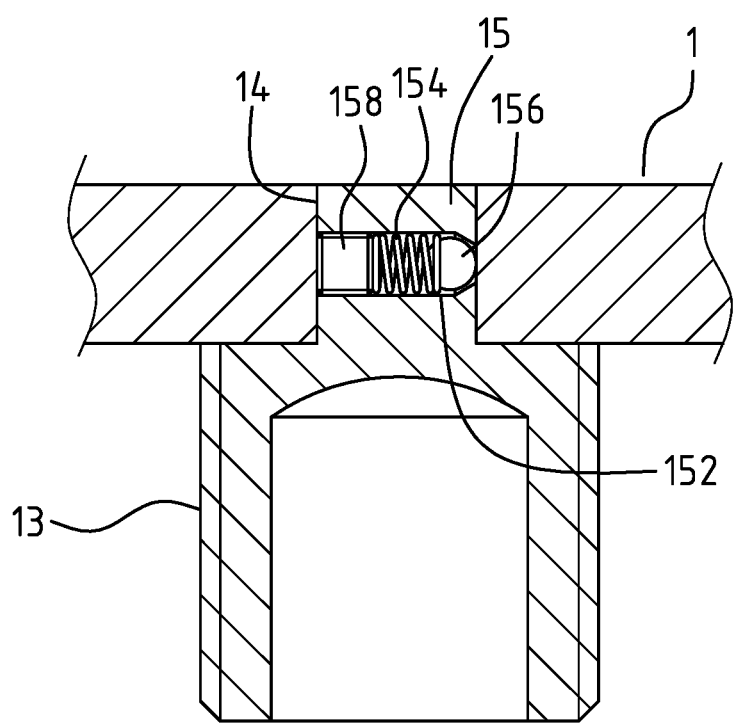
FIG. 8 is a cross-sectional view of an apparatus for returning pistons into a caliper of a disc brake according to the second embodiment of the present invention.
Figure 9:
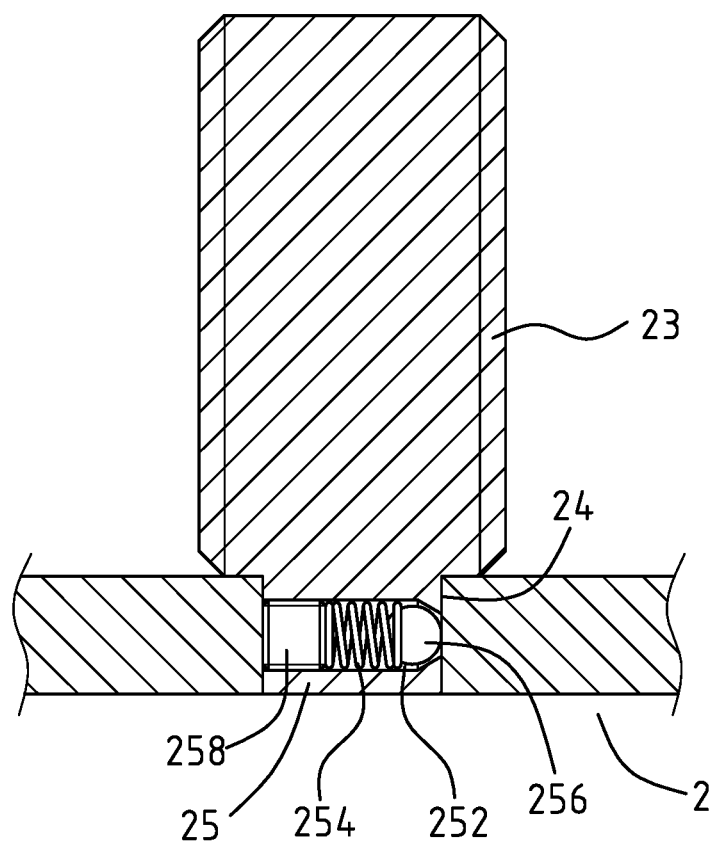
FIG. 9 is another cross-sectional view of the apparatus shown in FIG. 8.

Referring to FIGS. 8 and 9, there is an apparatus for returning pistons into a caliber of a disc brake according to a second embodiment of the present invention. The second embodiment is identical to the first embodiment except for several things. Firstly, the first pushing plate 1 includes a rectangular aperture 14, and the second pushing plate 2 includes a rectangular aperture 24. Accordingly, the first threaded element 13 includes a rectangular insert 15, and the second threaded element 23 includes a rectangular insert 25. The inserts 15 and 25 are respectively inserted in the apertures 14 and 24 so that the first and second threaded elements 13 and 23 are respectively connected to the first and second pushing plates 1 and 2 via the inserts 15 and 25. Thus, the first and second pushing plates 1 and 2 of different sizes can be connected to the first and second threaded elements 13 and 23 according to calibers of different sizes.

Secondly, the insert 15 is made with a screw hole 152 that extends parallel to the first pushing plate 1 and includes a smaller open end and a larger open end. A spring 154, an abutting element 156 and a socket set screw 158 are inserted in the screw hole 152. The spring 154 is compressed between the abutting element 156 and the socket set screw 158. The diameter of the abutting element 156 is larger than that of the smaller open end of the screw hole 152 so that the abutting element 156 is retained in the screw hole 152 except for a portion that extends out of the screw hole 152 and abuts against the wall of the aperture 14. The socket set screw 158 can be rotated to adjust the extent to which the abutting element 156 abuts against the wall of the aperture 14, thereby adjusting the extent to which the first threaded element 13 is connected to the first pushing plate 1.

Similarly, the insert 25 is made with a screw hole 252 that extends parallel to the second pushing plate 2 and includes a smaller open end and a larger open end. A spring 254, an abutting element 256 and a socket set screw 258 are inserted in the screw hole 252. The spring 254 is compressed between the abutting element 256 and the socket set screw 258. The diameter of the abutting element 256 is larger than that of the smaller open end of the screw hole 252 so that the abutting element 256 is retained in the screw hole 252 except for a portion that extends out of the screw hole 252 and abuts against the wall of the aperture 24. The socket set screw 258 is rotatable to adjust the extent to which the abutting element 256 abuts against the wall of the aperture 24, thereby adjusting the extent to which the second threaded element 23 is connected to the second pushing plate 2.

The present invention has been described via illustration of the embodiments. Those skilled in the art can derive variations from the embodiments without departing from the scope of the present invention. Therefore, the embodiments shall not limit the scope of the present invention defined in the claims.

The invention claimed is:

1. A piston-returning apparatus for a disc brake comprising:
   a first pushing plate (1) comprising a first threaded element (13);
   a second pushing plate (2) extending parallel to the first pushing plate (1) and comprising a second threaded element (23);
   a collar (3) located between the first and second pushing plates (1, 2) and comprising an annular flange (33) formed thereon, a first screw hole (31) for receiving the first threaded element (13), and a second screw hole (32) for receiving the second threaded element (13) so that the first and second pushing plates (1, 2) are synchronously moved toward or away from the collar (3) when the collar (3) is rotated;
   a rotating unit (4) connected to the collar (3) and comprising:
   two restraining plates (41) that rotationally support the collar (3) and abut against two opposites sides of the annular flange (33);
   a movable plate (43) located between the restraining plates (41) and comprising:
   a front edge near the annular flange (33);
   a rear edge near a handle (5);
   two slots (431), each comprising first and second recesses (432, 433) extending toward the rear edge from two ends thereof;
   first and second rear cutouts (434, 435) made in the rear edge;
   a front cutout (437) made in the front edge and made with a depth that is larger in a middle portion than at two ends;
   a first roller (45) movable in the front cutout (437) and adapted for abutment against the annular flange (33);
   two pins (47), each extending throughout a corresponding one of the slots (431) and comprising two ends connected to the restraining plates (41);
   a holding plate (44) located between the restraining plates (41) and comprising two cutouts (442) made in an internal edge and each made with a depth that is deeper in a middle portion than at two ends; and
   two second rollers (46) movably inserted in the cutouts (442) of the holding plate (44) and adapted for abutment against the annular flange (33), wherein each of the second rollers (46) is made with a diameter smaller than a depth of the cutouts (442) of the holding element (44) in the middle portion but larger than a depth of the cutouts (442) of the holding element (44) at the two ends; and
   the handle (5) comprising a slit (51) closed on two sides by the restraining plates (41), a spring (52) inserted in the slit (51), and a ball (53) inserted in the slit (51) and pushed into a selected one of the first and second rear cutouts (434, 435) by the spring (52) to keep the movable plate (43) in a selected one of two positions relative to the handle (5).

2. The piston-returning apparatus according to claim 1, wherein the first screw hole (31) is in communication with the second screw hole (32), wherein the first threaded element (13) comprises a bore (132) for receiving the second threaded element (23), wherein the bore (132) is made with a diameter larger than that of the second threaded element (23).

3. The piston-returning apparatus according to claim 1, wherein the movable plate (43) comprises an upper end extending beyond upper edges of the restraining plates (41) and a lower end extending beyond lower edges of the restraining plates (41) so that the movable plate (43) can easily be moved by the upper and lower ends.

4. The piston-returning apparatus according to claim 1, wherein each of the first and second pushing plates (1, 2) comprises a rectangular aperture (14, 24), wherein each of the first and second threaded elements (13, 23) comprises a rectangular insert (15, 25) inserted in the rectangular aperture (14, 24) of a corresponding one of the first and second pushing plates (1, 2) to connect each of the first and second threaded elements (13, 23) to a corresponding one of the first and second pushing plates (1, 2).

5. The piston-returning apparatus according to claim 4, wherein the rectangular insert (15, 25) of each of the first and second pushing plates (1, 2) comprises a screw hole (152, 252), a spring (154, 254) inserted in the screw hole (152, 252), an abutting element (156, 256) inserted in the screw hole (152, 252), and a socket set screw (158, 258) inserted in the screw hole (152, 252), the spring (154, 254) is compressed between the abutting element (156, 256) and the socket set screw (158, 258) so that the spring (154, 254) abuts the abutting element (156, 256) against a wall of the rectangular aperture (14, 24) of the first and second pushing plates (1, 2).

* * * * *